Dec. 25, 1956     J. KOSANOVICH     2,775,059
FISH BOBBER ATTACHMENT
Filed May 4, 1953
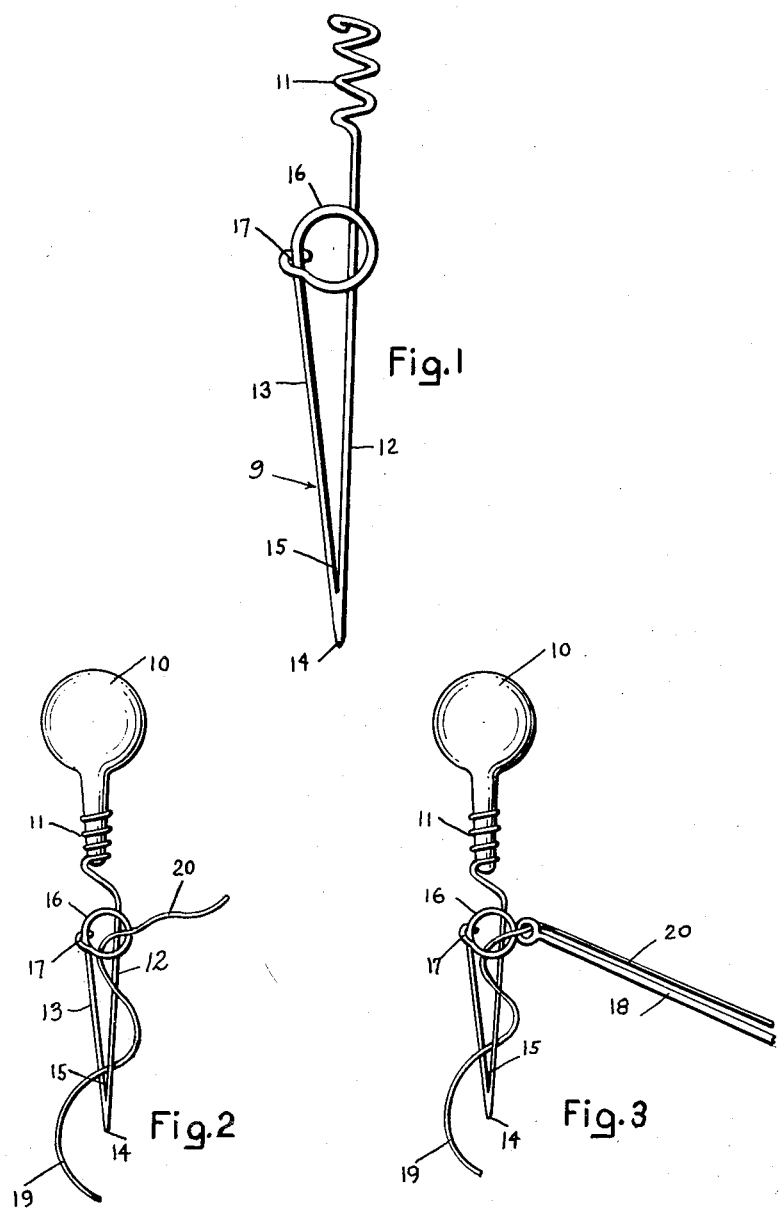
INVENTOR.
JOHN KOSANOVICH

United States Patent Office 2,775,059
Patented Dec. 25, 1956

2,775,059

FISH BOBBER ATTACHMENT

John Kosanovich, Pittsburgh, Pa.

Application May 4, 1953, Serial No. 352,632

1 Claim. (Cl. 43—44.88)

This invention relates to a new and useful improvement in an attachment for use on a fish bobber, or float.

One of the objects of this invention is the provision of a fish line holding device formed from a length of light weight resilient wire and adapted to be attached to a conventional fish bobber, or float for fishing.

Another object of this invention is the provision of a fish line holding device having means for frictionally engaging a fish line and means for releasing the line from frictional engagement by the tip of a fishing rod.

Another object of the invention is the provision of a fish line holding device that provides a means for fishing at any desired depth by the holding of the line taut so as to maintain the hook and bait, or lure, at the depth desired for fishing.

Other objects attainable by the invention, and not recited herein, will be readily ascertained by a reading of the following description and a reference to the associated drawing, in which:

Figure 1 is a side elevation view of the invention,

Fig. 2 is a view of the device attached to a bobber and showing a fish line connected thereto, and Fig. 3 is a view similar to Fig. 2 showing a rod tip contacting the device to release the fish line.

Referring to the drawings the fish bobber attachment of this invention is designated generally by the reference numeral 9. The attachment 9 is formed from a length of resilient wire into a body having the form shown in Fig. 1. The wire is formed into a coil 11 at one end portion thereof, and has two straight portions 12 and 13 forming the legs of a V to provide a clamping means 15 between the said legs and adjacent the vertex, or point 14. The opposite end portion of the wire is formed into a loop 16, the free end of said loop, designated by 17, being bent around the adjacent end part of the leg 13.

It will be observed that the length of wire used to form the device is of about a 20 gauge which is found to be most suitable. The device is attached to, or fixed on, one end of a fish bobber, or float 10, by means of the coiled end portion 11 and the line 19 is threaded through the loop 16 by passing it between the portion 13 and the free end 17 and then pulling it down into the narrowest space between the said legs 12 and 13 at 15, the line being squeezed between said legs is held taut and thus holds the hook and bait, or lure, in a suspended position at the desired depth in the water.

When the portion 20 of the line is wound, or reeled in, the tip of rod 18 will contact the said loop 16 and cause the line to be freed from its squeezed position in the V-space. The line is now free to pass through the loop to complete the winding, or reeling thereof, and the bobber, or float will be supported on the line by reason of the line being threaded through the loop 16.

I have shown the invention in a desired form and structure, however, minor changes may be made therein without departing from the spirit of the invention, or the scope of the claim appended hereto.

What I claim and desire to secure by Letters Patent is:

In a fishing line holder, a wire bent into a V-shaped body having diverging straight legs adapted to frictionally hold a line therebetween, the free end of one leg being formed into a coil to enable the body to be attached to a float or bobber, and the free end of the other leg being formed into a loop to receive and guide a portion of said line and bent around itself closing said loop.

References Cited in the file of this patent

UNITED STATES PATENTS

| | | |
|---|---|---|
| 198,879 | Fisher | Jan. 1, 1878 |
| 360,418 | Clark | Apr. 5, 1887 |
| 546,771 | Benoit | Sept. 24, 1895 |
| 724,713 | Kimman | Apr. 7, 1903 |
| 735,235 | Foust | Aug. 4, 1903 |
| 977,384 | Glynn | Nov. 29, 1910 |
| 1,934,845 | Durham | Nov. 14, 1933 |
| 2,399,298 | Severgny | Apr. 30, 1946 |
| 2,518,634 | Peterson | Apr. 15, 1950 |
| 2,563,560 | Stafford | Aug. 7, 1951 |